(12) United States Patent
Mehn et al.

(10) Patent No.: US 11,141,808 B2
(45) Date of Patent: *Oct. 12, 2021

(54) FUME EXTRACTOR FOR WELDING APPLICATIONS

(71) Applicant: ILLINOIS TOOL WORKS INC., Glenview, IL (US)

(72) Inventors: Peter Donald Mehn, Oshkosh, WI (US); Allan Thomas Hilbert, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,164

(22) Filed: Mar. 22, 2017

(65) Prior Publication Data

US 2017/0189988 A1 Jul. 6, 2017

Related U.S. Application Data

(63) Continuation of application No. 13/356,160, filed on Jan. 23, 2012, now Pat. No. 9,623,506.

(60) Provisional application No. 61/438,577, filed on Feb. 1, 2011.

(51) Int. Cl.
*B23K 9/32* (2006.01)
*B23K 9/10* (2006.01)

(52) U.S. Cl.
CPC ............ *B23K 9/325* (2013.01); *B23K 9/1006* (2013.01)

(58) Field of Classification Search
CPC .......... B23K 9/32; B23K 9/321; B23K 9/322; B23K 9/325; B23K 9/326; B23K 9/328; B08B 15/002; B08B 15/04

USPC .................... 219/130.1, 133, 137.31, 137.41
See application file for complete search history.

(56) References Cited

U.S. PATENT DOCUMENTS

| 2,185,919 | A | 1/1940 | Kurth |
| 2,210,458 | A | 8/1940 | Keilholtz |
| 2,289,474 | A | 7/1942 | Anderson |
| 2,367,104 | A | 1/1945 | Demuth |

(Continued)

FOREIGN PATENT DOCUMENTS

| AU | 637737 | 6/1993 |
| CH | 682512 | 9/1993 |

(Continued)

OTHER PUBLICATIONS

International Search Report from PCT application No. PCT/US2012/022599, dated May 2, 2012, 11 pgs.

(Continued)

*Primary Examiner* — Robert J Utama
*Assistant Examiner* — Ayub A Maye
(74) *Attorney, Agent, or Firm* — McAndrews, Held & Malloy, Ltd.

(57) ABSTRACT

A welding system having a welding power supply coupled to a fume extractor is provided. The fume extractor may be coupled to control circuitry configured to operate the welding power supply. The control circuitry may be configured to begin, terminate or modify the operation of the fume extractor prior to the establishment of a welding arc, after the termination of the welding arc, or both. The control circuitry may be further configured to modify the operation of the fume extractor based upon a type of welding process used.

11 Claims, 2 Drawing Sheets

(56) References Cited

U.S. PATENT DOCUMENTS

| | | | |
|---|---|---|---|
| RE24,637 E | 4/1959 | Wulle | |
| 2,910,558 A | 10/1959 | Engelhardt | |
| 3,318,227 A | 5/1967 | Nelson | |
| 3,364,664 A | 1/1968 | Doane | |
| 3,430,551 A | 3/1969 | Hauville | |
| 3,487,767 A | 1/1970 | Kristiansen | |
| 3,886,344 A * | 5/1975 | Frantzreb, Sr. | B08B 15/04 219/137.41 |
| 3,980,860 A * | 9/1976 | Howell | B08B 15/04 219/136 |
| 4,016,398 A * | 4/1977 | Herrick | B08B 15/04 219/136 |
| 4,033,846 A | 7/1977 | Engesland | |
| 4,043,257 A | 8/1977 | Aaberg | |
| 4,095,080 A * | 6/1978 | Ueyama | B23K 9/164 219/137.41 |
| 4,158,462 A | 6/1979 | Coral | |
| 4,160,407 A | 7/1979 | Duym | |
| 4,163,650 A | 8/1979 | Bonham | |
| 4,276,464 A * | 6/1981 | Forney | B08B 15/04 219/136 |
| 4,287,405 A * | 9/1981 | Ohmae | B08B 15/04 15/319 |
| RE31,266 E | 6/1983 | Engesland | |
| 4,450,756 A | 5/1984 | Kling | |
| 4,493,970 A | 1/1985 | Rieppel | |
| 4,502,375 A | 3/1985 | Hignite | |
| 4,552,059 A | 11/1985 | Potter | |
| 4,607,614 A | 8/1986 | Higashino | |
| 4,717,805 A | 1/1988 | Miyagawa | |
| 4,823,971 A | 4/1989 | Her | |
| 4,905,716 A | 3/1990 | Hubbard | |
| 5,058,490 A | 10/1991 | Sodec | |
| 5,069,197 A | 12/1991 | Wisting | |
| 5,079,404 A * | 1/1992 | Zamuner | B23K 9/325 219/137.41 |
| 5,223,005 A | 6/1993 | Avondoglio | |
| 5,263,897 A | 11/1993 | Kondo | |
| 5,281,246 A | 1/1994 | Ray | |
| 5,395,410 A | 3/1995 | Jang | |
| 5,410,120 A | 4/1995 | Taylor | |
| 5,427,569 A | 6/1995 | Plymoth | |
| 5,540,214 A | 7/1996 | Boudreault | |
| 5,549,512 A | 8/1996 | Sinclair | |
| 5,713,346 A | 2/1998 | Kuechler | |
| 5,718,219 A | 2/1998 | Boudreault | |
| 5,890,484 A | 4/1999 | Yamada | |
| 5,904,751 A | 5/1999 | Van Niekerk | |
| 6,037,725 A | 3/2000 | Tolbert, Jr. | |
| 6,099,607 A | 8/2000 | Haslebacher | |
| 6,332,837 B1 | 12/2001 | Wilk | |
| 6,358,137 B1 | 3/2002 | Threlfall | |
| 6,569,008 B1 | 5/2003 | Chang | |
| 6,607,573 B1 | 8/2003 | Chaurushia | |
| 6,616,720 B1 | 9/2003 | Smith | |
| 6,620,038 B1 | 9/2003 | Kikuchi | |
| 6,632,132 B1 | 10/2003 | Kikuchi | |
| 6,780,213 B2 | 8/2004 | Chang | |
| 6,913,014 B2 | 7/2005 | Chiang | |
| 7,000,634 B2 | 2/2006 | Lindborg | |
| 7,959,696 B2 | 6/2011 | Martic | |
| 8,176,766 B1 | 5/2012 | Ruiz | |
| 8,211,194 B2 | 7/2012 | Takayanagi | |
| 8,312,873 B2 | 11/2012 | Gagas | |
| 8,460,417 B2 | 6/2013 | Reid | |
| 8,892,222 B2 | 11/2014 | Simms | |
| 2002/0039881 A1 | 4/2002 | Coral | |
| 2003/0181158 A1 | 9/2003 | Schell | |
| 2005/0170767 A1 | 8/2005 | Enzenroth | |
| 2005/0204582 A1 | 9/2005 | Rossi | |
| 2006/0157048 A1 | 7/2006 | Heilman | |
| 2007/0017956 A1 * | 1/2007 | Karogal | B23K 35/3607 228/101 |
| 2007/0202791 A1 | 8/2007 | Lee | |
| 2007/0281598 A1 | 12/2007 | Huang | |
| 2008/0305731 A1 | 12/2008 | Reid | |
| 2009/0088060 A1 | 4/2009 | Arnold | |
| 2009/0321403 A1 * | 12/2009 | Brenneke | B23K 9/321 219/137.41 |
| 2010/0206799 A1 | 8/2010 | Leavitt | |
| 2010/0282728 A1 | 11/2010 | Cole | |
| 2012/0111845 A1 * | 5/2012 | Simms | B08B 15/002 219/137 R |
| 2012/0193334 A1 | 8/2012 | Mehn | |
| 2013/0122795 A1 | 5/2013 | Hammers | |
| 2013/0162177 A1 | 6/2013 | Hofsdal | |
| 2013/0244555 A1 | 9/2013 | Hammers | |
| 2013/0244556 A1 | 9/2013 | Hammers | |
| 2013/0244557 A1 | 9/2013 | Hammers | |
| 2013/0244558 A1 | 9/2013 | Hammers | |
| 2013/0244559 A1 | 9/2013 | Hammers | |
| 2013/0244560 A1 | 9/2013 | Hammers | |
| 2014/0213164 A1 | 7/2014 | Leisner | |
| 2014/0214213 A1 | 7/2014 | Rockenfeller | |
| 2014/0253008 A1 | 9/2014 | Sykes | |
| 2015/0000232 A1 | 1/2015 | Hammers | |
| 2015/0004895 A1 | 1/2015 | Hammers | |

FOREIGN PATENT DOCUMENTS

| | | |
|---|---|---|
| CN | 2146665 | 11/1993 |
| CN | 2225253 | 4/1996 |
| CN | 2413708 | 1/2001 |
| CN | 1384909 | 12/2002 |
| CN | 200984583 | 12/2007 |
| CN | 101332392 | 12/2008 |
| CN | 101618925 | 1/2010 |
| CN | 101733228 | 6/2010 |
| CN | 201609707 | 10/2010 |
| CN | 101327109 | 12/2011 |
| CN | 202087569 | 12/2011 |
| CN | 102483240 | 5/2012 |
| CN | 101526239 | 7/2012 |
| CN | 102699002 | 10/2012 |
| DE | 1604293 | 9/1970 |
| DE | 3412204 | 10/1985 |
| DE | 4413600 | 11/1995 |
| DE | 10020736 | 10/2001 |
| DE | 20221100 | 1/2005 |
| DE | 102005016721 | 10/2006 |
| DE | 102005033224 | 7/2007 |
| DE | 102006055001 | 5/2008 |
| DE | 102009030220 | 12/2010 |
| EP | 0511576 | 11/1992 |
| EP | 0536871 | 4/1993 |
| EP | 1227283 | 7/2002 |
| EP | 1967796 | 9/2008 |
| EP | 2368646 | 9/2011 |
| EP | 2422865 | 2/2012 |
| FR | 2613551 | 10/1988 |
| FR | 2911520 | 7/2008 |
| GB | 546878 | 8/1942 |
| GB | 1069868 A | 5/1967 |
| GB | 2030825 | 5/1980 |
| GB | 2032825 A | 5/1980 |
| JP | S54147647 | 11/1979 |
| JP | H01179841 | 7/1989 |
| JP | H04063183 | 2/1992 |
| JP | H06292970 | 10/1994 |
| JP | H10288371 | 10/1998 |
| WO | 0048752 A1 | 8/2000 |
| WO | 0184054 | 11/2001 |
| WO | 2004088812 | 10/2004 |
| WO | 2005022046 | 3/2005 |
| WO | 2005045323 | 5/2005 |
| WO | 2005106337 | 11/2005 |
| WO | 2008032571 | 3/2008 |

OTHER PUBLICATIONS

International Search Report from PCT application No. PCT/US2014/011860, dated Apr. 24, 2015, 10 pgs.

(56) References Cited

OTHER PUBLICATIONS

International Search Report from PCT application No. PCT/US2014/036956, dated Aug. 29, 2014, 14 pgs.
International Search Report from PCT application No. PCT/US2014/044119, dated Sep. 10, 2014, 10 pgs.
International Search Report from PCT application No. PCT/US2012/064081, dated Feb. 14, 2013, 12 pgs.
International Search Report from PCT application No. PCT/US2013/030694, dated Aug. 20, 2013, 15 pgs.
International Search Report from PCT application No. PCT/US2013/030697, dated Jul. 30, 2013, 13 pgs.
International Search Report from PCT application No. PCT/US2013/031237, dated Jul. 23, 2013, 11 pgs.
International Search Report from PCT application No. PCT/US2013/031246, dated Aug. 9, 2013, 13 pgs.
International Search Report from PCT application No. PCT/US2013/031251, dated Aug. 6, 2013, 15 pgs.
International Search Report from PCT application No. PCT/US2013/031261, dated Jul. 25, 2013, 13 pgs.

* cited by examiner

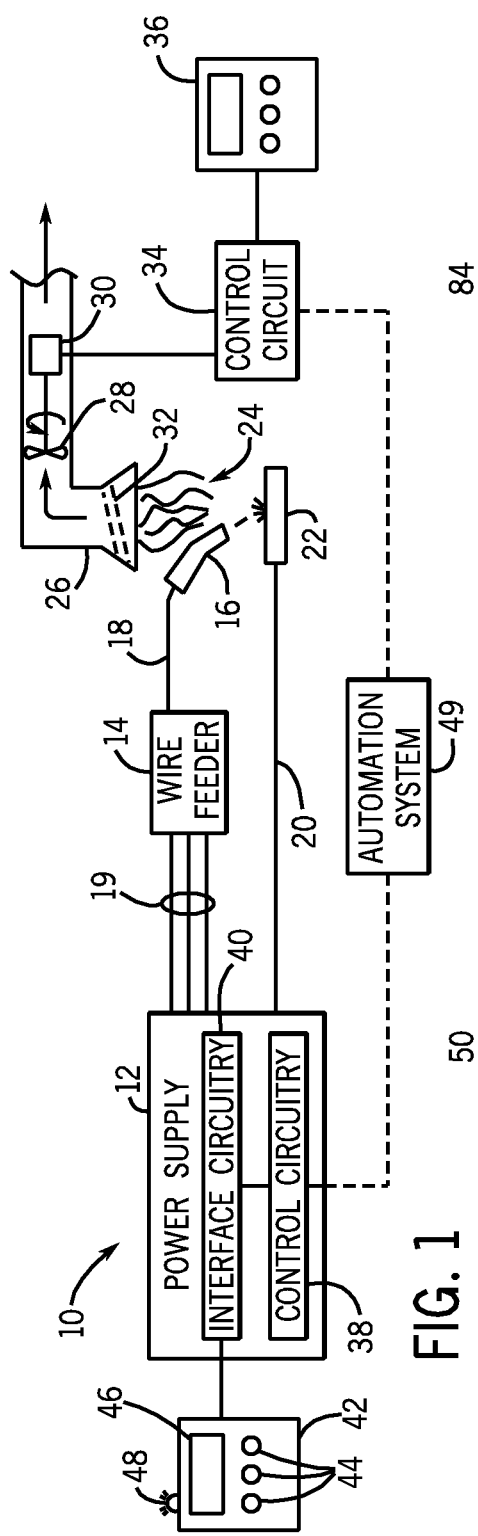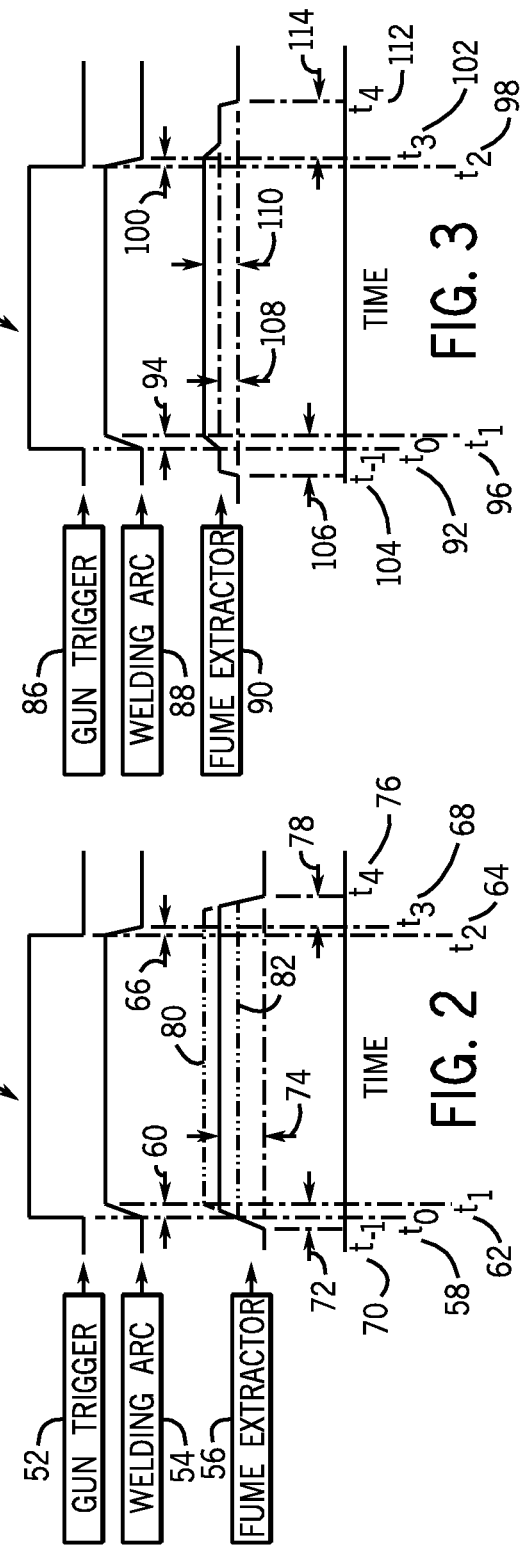

FUME EXTRACTOR FOR WELDING APPLICATIONS

CROSS REFERENCE TO RELATED APPLICATIONS

This application is a Continuation Patent Application of U.S. patent application Ser. No. 13/356,160, entitled "Fume Extractor for Welding Applications", filed Jan. 23, 2012, which is a Non-Provisional Patent Application of U.S. Provisional Patent Application No. 61/438,577, entitled "Fume Extractor for Welding Applications", filed Feb. 1, 2011, both of which are herein incorporated by reference in their entireties for all purposes.

BACKGROUND

The invention relates generally to welding systems, and, more particularly, to a variable speed fume extractor, cutting fumes extractor, or dust collector for use in a welding system.

Welding is a process that has become increasingly ubiquitous in various industries and applications. While such processes may be automated in certain contexts, a large number of applications continue to exist for manual welding operations. Some welding processes produce fumes and gases are evacuated by air-circulation systems. Several methods of air ventilation are available to help remove welding fumes from a welding environment, such as local-exhaust ventilation systems and air blowers. One example of a local-exhaust ventilation system is a fume extractor which helps remove fumes and gases at their source. However, fume extractors frequently may be manually turned on and left to run at full speed when welding fumes are not being produced (i.e., before the welding process has begun or after the welding process has finished). Similarly, some welding processes may produce different amounts of gases, and, consequently, a fume extractor running at a fixed or top speed may not be necessary.

BRIEF DESCRIPTION

In an exemplary embodiment, a welding system includes a welding power supply configured to generate welding power, control circuitry configured to control operation of the welding power supply, and a welding torch assembly electrically coupled to receive welding power from the welding power supply and configured to perform arc welding during operation. The welding system further includes a fume extractor disposed adjacent to a welding application for extracting fumes produced during welding. The fume extractor is coupled to the control circuitry and is configured to operate either prior to establishment of a welding arc or after termination of the welding arc, or both based upon signals from the control circuitry.

In another exemplary embodiment, a method for operating a welding system includes providing welding power form a welding power supply to a welding application and controlling the welding power via control circuitry. The method also includes controlling a fume extractor disposed adjacent to a welding application for extracting fumes produced during an arc welding operation. The fume extractor is coupled to the control circuitry and is configured to operate either prior to establishment of a welding arc or after termination of the welding arc, or both based upon signals from the control circuitry.

In a further embodiment, a welding system includes a fume extractor disposed adjacent to a welding application for extracting fumes produced during welding where the fume extractor is coupled to control circuitry and is configured to operate either prior to establishment of a welding arc or after termination of a welding arc, or both based upon signals from the control circuitry.

DRAWINGS

These and other features, aspects, and advantages of the present invention will become better understood when the following detailed description is read with reference to the accompanying drawings in which like characters represent like parts throughout the drawings, wherein:

FIG. 1 is a schematic illustration of an exemplary welding system including a welding power supply coupled to a fume extractor in accordance with aspects of the present invention;

FIG. 2 is an exemplary timing diagram illustrating sequences of events in the operation of an embodiment of the welding system of FIG. 1;

FIG. 3 is another exemplary timing diagram illustrating sequences of events in the operation of another embodiment of the welding system of FIG. 1.

DETAILED DESCRIPTION

Figure 4:
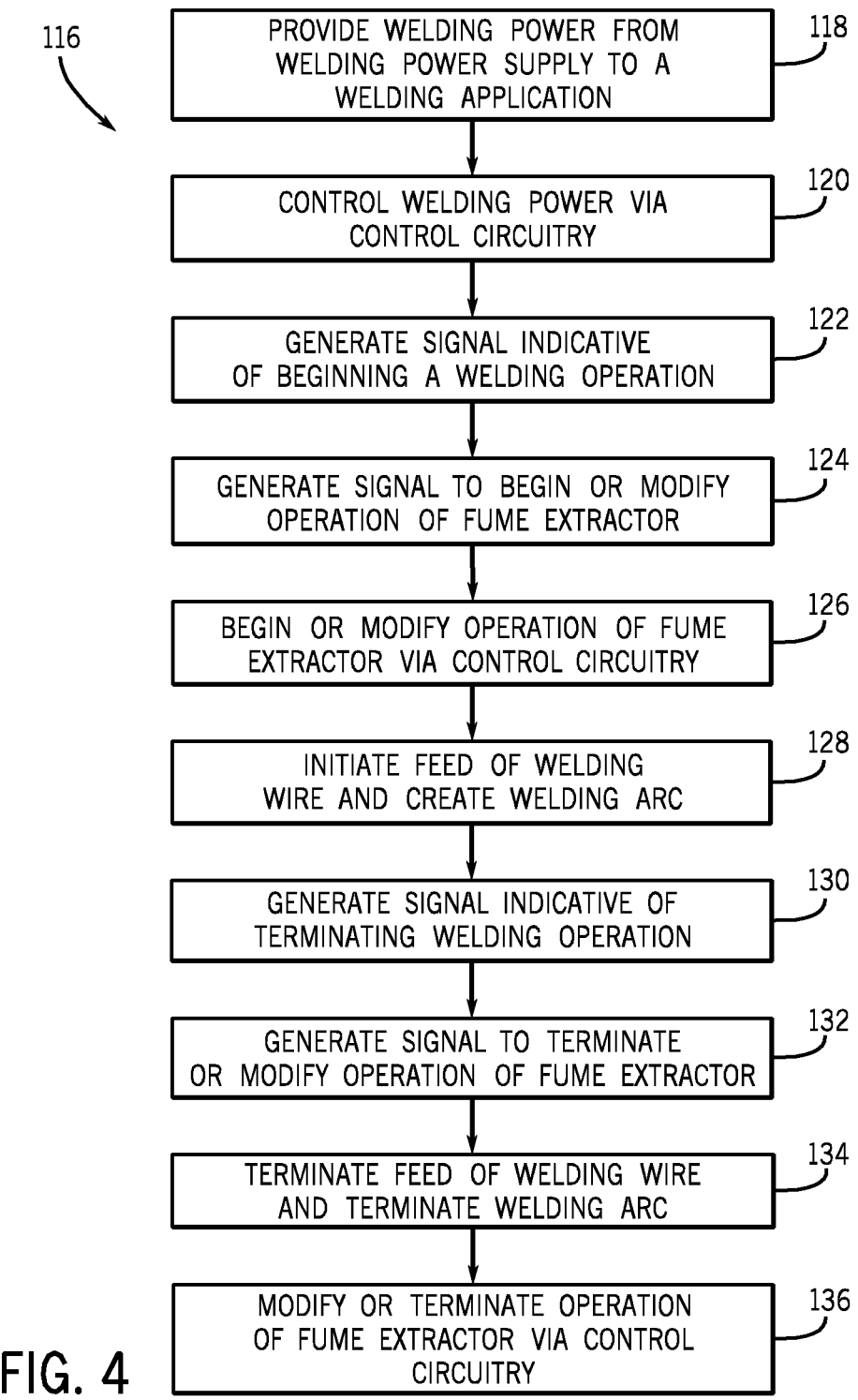
FIG. 4 is a flow chart illustrating an exemplary method of operating a welding system having a welding power supply coupled to a fume extractor in accordance with aspects of the present invention.

As described in detail below, embodiments of a welding system including a welding power supply coupled to a fume extractor are described. The fume extractor is adapted to operate prior to establishment of a welding arc, after termination of the welding arc, or both, based upon signals from control circuitry that is also configured to control operation of a power welding supply. That is, the control circuitry may be configured to operate the fume extractor prior to establishment of a welding arc, after termination of a welding arc, or both. Similarly, the control circuitry may be adapted to operate the fume extractor at a first speed while a welding arc is ongoing during a welding operation and at a second speed prior to establishment of the welding arc and/or after termination of the welding arc. Additionally, the control circuitry may be configured to operate the fume extractor at a particular speed based on the type of welding process selected. In certain embodiments, the welding system may include a user interface coupled to the control circuitry through which a user may select the desired welding process. The foregoing features may have the effect of reducing operating costs of the fume extractor, increasing fume extractor filter life and reducing unnecessary fume extractor noise.

Turning now to the drawings, FIG. 1 illustrates an exemplary welding system 10 which powers, controls, and provides supplies to a welding operation. The welding system 10 includes a welding power supply 12, a welding wire feeder 14, and a welding gun 16. The power supply 12 may be a power converter style welding power supply or an inverter welding power supply requiring a power source. In other embodiments, the welding power supply 12 may be a generator or alternator welding power supply which may include an internal combustion engine. The welding power supply 12 may provide power to the welding wire feeder 14 and may be coupled to the welding wire feeder 14 by a plurality of cables 19 which may include a feeder power lead, a weld cable, a gas hose, a control cable, etc. The welding wire feeder 14 provides welding wire to the welding gun 16 for use in the welding operation. The welding wire feeder 14 may include a control panel (not shown) that allows the user to set one or more wire feed parameters, such as wire feed speed. Additionally, the wire feeder 14 may house a variety of internal components, such as a wire spool, a wire feed drive system, a motor, and so forth.

As shown in the illustrated embodiment, a first cable 18 may connect the welding wire feeder 14 and the welding gun 16. As will be appreciated, welding wire may be fed to the welding gun 16 through the first cable 18. Additionally, the first cable 18 may also supply gas to the welding gun 16. As further shown, a second cable 20 couples the welding power supply 12 to a work piece 22 to complete the circuit between the welding power supply 12 and the welding gun 16 during a welding operation. As mentioned above, the welding process produces fumes 24 which are removed the fumes 24 from the welding environment by a ventilation system such as a fume extractor 26. As shown in the illustrated embodiment, the fume extractor 26 may be placed directly above the work piece 22 to promptly extract the welding fumes 24 from the local welding environment as they are produced by the welding operation. In other embodiments, the fume extractor 26 may be placed above and to the side of the work piece 22, directly to a side of the work piece 22, or at the rear of the work piece 22. Furthermore, the fume extractor 26 may be stationary or portable.

The fume extractor 26 may include a fan 28 driven by a motor 30. As will be appreciated, the fan 28 may rotate and draw the welding fumes 24 into the fume extractor 26, as shown. The fume extractor 26 will also typically include a filter 32. In certain embodiments, the fume extractor 26, including the fan 28, motor 30, and filter 32, may be located within the welding gun 16. In operation, the fume extractor 26 draws the welding fumes 24 into the fume extractor 26, and the welding fumes 24 pass through the filter 32. The filter 32 may remove smoke and particulate matter forming the fumes 24. In some embodiments, after certain air-borne constituents are removed from the welding fumes 24, the purified air may be returned to the workspace. In certain embodiments, the fume extractor 26 may have a control circuit 34 and a user interface 36. As will be appreciated, the user may manually operate the fume extractor 26 using the user interface 36. For example, the user may manually turn on the fume extractor 26, manually turn off the fume extractor 26, or manually adjust the speed of the fume extractor 26 using the user interface 36 coupled to the control circuit 34 of the fume extractor 26.

In embodiments of the present invention, the fume extractor 26 may be coupled to control circuitry 38 that is configured to control the operation of the welding power supply 12. As discussed in further detail below, in addition to being configured to operate the welding power supply 12, the control circuitry 38 may be configured to apply control signals to the control circuit 34 and/or the motor 30 of the fume extractor 26. More particularly, the control circuitry 38 may be configured to control the operation of the fume extractor 26 prior to the establishment of a welding arc, after the termination of the welding arc, or both. For example, in certain embodiments, the welding power supply 12 may include a welding arc monitoring system or a welding power monitoring system. In such an embodiment, when a welding operation is initiated, the control circuitry 38 may apply a control signal to the fume extractor 26 to begin operation of the fume extractor 26. Similarly, after a welding operation has terminated, the control circuitry 38 may apply a control signal to the fume extractor 26 to terminate operation of the fume extractor 26. The control circuitry 38 may also apply control signals to the fume extractor 26 to modify the operation of the fume extractor 26. As discussed in detail below, the fume extractor 26 may initially operate at a first speed and, after a welding operation is initiated, the control circuitry 38 may apply control signals to the fume extractor 26 to operate at a second speed. Subsequently, once the welding operation is terminated, the control circuitry 38 may apply control signals to the fume extractor 26 to resume operation at the first speed.

Furthermore, in some embodiments, the control circuitry 38 may be configured to apply particular control signals to the fume extractor 26 based upon the type of welding process used. For example, the fume extractor 26 may be operated at a particular speed dependent on the welding process used. As will be appreciated, certain welding processes may produce fewer welding fumes 24. For such welding processes, it may be more efficient to operate the fume extractor 26 at a speed less than full speed, or more generally, at some reduced speed. By way of example, a pulse welding process may require that the fume extractor 26 operate at a lower speed, while a self-shielded process may require that the fume extractor operate at a higher speed. As will be appreciated by those skilled in the art, although the present discussion refers to "speed", in practice, the system may be controlled based upon mass or volumetric flow rate, by control of the motor speed, by opening or closing of louvers, and so forth.

As shown in the illustrated embodiment, the welding power supply 12 may also include interface circuitry 40 coupled to the control circuitry. Further, a user interface 42 may be coupled to the interface circuitry 40. The user interface 42 may include knobs 44, a display 46 and an indicator light 48. In certain embodiments, the user interface 42 may be configured to display a menu including a plurality of welding processes. The user may select the welding process to be used through the user interface 42. The user interface 42 may communicate the selection to the interface circuitry 40, which may subsequently communicate the selection to the control circuitry 38. Thereafter, the control circuitry 38 may apply appropriate control signals to the fume extractor 26 to operate at a desired speed during a welding operation.

In another embodiment of the present invention, the fume extractor 26 and the control circuitry 38 may be configured to alert a user of a particular event or occurrence regarding the operation of the fume extractor 26. For example, the control circuitry 38 may be configured to alert a user that the filter 32 is dirty or needs to be replaced. For further example, the control circuitry 38 may be configured to alert a user of an error in the operation of the fume extractor 26. In such circumstances, the control circuitry 38 may communicate the alert to the interface circuitry 40, and the interface circuitry 40 may thereafter communicate the alert to the user interface 42. The user interface 42 may then illuminate the indicator light 48, which may be a warning light or alarm light.

It should be noted that modifications to the exemplary welding system 10 of FIG. 1 may be made in accordance with aspects of the present invention. For example, certain embodiments may include an automation system 49 configured to communicate with the control circuitry 38 of the power supply 12 and the control circuit 24 of the fume extractor 34. Similarly, in welding systems 10 having an arc monitoring system, the automation system 49 may be connected to the arc monitoring system. By way of example, the automation system 49 may be a welding robot. As will be appreciated, the automation system 49 may be connected to the control circuitry 38 and/or control circuit 24 with a hardwired link or a radio frequency link. The automation system 49 may communicate the initiation or termination of a welding process to the control circuitry 38, which may prompt the control circuitry 38 to apply control signals to the fume extractor 26 to modify the operation of the fume extractor 26.

FIG. 2 illustrates an exemplary timing diagram 50 for events that may occur during operation of an embodiment of the welding system 10, which includes the power supply 12, the welding gun 16 and the fume extractor 26. The timing diagram 50 includes a welding gun trigger plot 52, a welding arc plot 54, and a fume extractor plot 56. Together, the plots illustrate the timing of various functions and events as the welding operation is initiated and terminated and as the operation of the fume extractor is initiated and terminated.

As shown, at a time 58, the gun trigger of the welding gun 16 is depressed, as shown in the gun trigger plot 52, and the creation of a welding arc begins, as shown in the welding arc plot 54. As further shown in the welding arc plot 54, the welding arc is not formed instantaneously. Rather, an arc generation period 60 is required for the welding arc to be established. Thereafter, at a time 62, the welding arc is established and the welding operation begins. After the welding operation has concluded, at a time 64, the gun trigger of the welding gun 16 is released, as shown in the gun trigger plot 52. The release of the gun trigger initiates an arc termination period 66, during which the welding arc is extinguished, as shown in the welding arc plot 54. At the conclusion of the arc termination period 66, at a time 68, the welding arc is completely extinguished.

As discussed above, the control circuitry 38 of the welding power supply 12 may be configured to apply control signals to the fume extractor 26 to begin operation prior to the beginning of a welding operation. Specifically, the welding power supply 12 may include an arc monitoring system or power monitoring system to generate a signal indicative of the beginning of a welding operation. Alternatively, the welding system 10 may include an arc monitoring system that is not integrated within the welding power supply 12. As shown in the fume extractor plot 70, the control circuitry 38 may apply control signals to the fume extractor 26 at a time 70, prior to the depression of the gun trigger at time 58. As further shown, the control circuitry 38 may apply the control signals to the fume extractor 26 a time period 72 prior to the establishment of the welding arc. As will be appreciated, the time period 72 may be great enough such that the fume extractor 26 is operating at a desired level 74, and an adequate extraction column is in place around the work piece 22, at the start of the welding operation at the time 62. For example the time period 72 may be equal to 5 seconds, 10 seconds, 15 seconds, or more. After the conclusion of the welding operation, at the time 64, the fume extractor may continue to operate until a time 76. As will be appreciated, welding fumes 24 may remain immediately after the conclusion of the welding operation. Consequently, the control circuitry 38 may be configured to operate the fume extractor 26 after for a time period 78 after the welding arc is extinguished at the time 68, as shown in the fume extractor plot 56. For example, in response to the release of the gun trigger at the time 64, the control circuitry 38 may apply control signals to the fume extractor 26 to continue operation for the time period 78 after the termination of the welding operation.

As discussed above, in may be desirable to operate the fume extractor 26 at different speeds for different welding operations. For example, a welding process producing fewer welding fumes 24 may require that the fume extractor 26 operate at a lower speed 82, as shown in the fume extractor plot 56. Alternatively, a welding process producing more welding fumes 24 may require that the fume extractor operate at a higher speed 80, as shown in the fume extractor plot 56.

FIG. 3 illustrates another exemplary timing diagram 84 that may be generated during operation of an embodiment of the welding system 10, which includes the power supply 12, the welding gun 16 and the fume extractor 26. The timing diagram 84 includes a gun trigger plot 86, a welding arc plot 88, and a fume extractor plot 90. Together, the plots illustrate the timing of various functions and events as the welding operation is initiated and terminated and as the operation of the fume extractor is modified.

Similar to the discussion above, at a time 92, the gun trigger of the welding gun 16 is depressed, as shown in the gun trigger plot 86, and the creation of a welding arc begins, as shown in the welding arc plot 88. As further shown in the welding arc plot 88, the welding arc is not formed instantaneously. Rather, an arc generation period 94 is required for the welding arc to be established. Thereafter, at a time 96, the welding arc is established and the welding operation begins. After the welding operation has concluded, at a time 98, the gun trigger of the welding gun 16 is released, as shown in the gun trigger plot 86. The release of the gun trigger initiates an arc termination period 100, during which the welding arc is extinguished, as shown in the welding arc plot 88. At the conclusion of the arc termination period 100, at a time 102, the welding arc is completely extinguished.

As discussed above, the control circuitry 38 of the welding power supply 12 may be configured to apply control signals to the fume extractor 26 to modify the operation of the fume extractor 26 prior to the beginning of the welding operation. Specifically, in certain embodiments, the user of the welding system 10 may manually begin the operation of the fume extractor 26 at a time 104 and a time period 106 prior to the beginning of the welding operation. More particularly, as shown in the fume extractor plot 90, the user may manually begin the operation of the fume extractor at a first speed 108. For example, the user may manually start the operation of the fume extractor 26 using the user interface 36. As will be appreciated, the first speed 108 may be a lower speed or an "idle" speed because the welding operation has not begun, and, consequently, no welding fumes 24 have been produced. Subsequently, once the trigger of the welding gun 16 is depressed at the time 92, the fume extractor 26 may increase its operating speed to a second speed 110. More specifically, in response to the depression of the trigger at the time 92, the control circuitry 38 may apply control signals to the fume extractor 26 to operate at the speed 110. After the welding operation is completed, and the gun trigger is released at the time 98, the control circuitry 38 may apply control signals to the fume extractor 26 to return to the first speed 108. Thereafter, the fume extractor 26 may remain operating at the first speed 108 until a time 112, a time period 114 after the welding arc has been extinguished, at which point the user may manually terminate the operation of the fume extractor 26. Alternatively, the fume extractor 26 may be left to operate at the first speed 108 until the beginning of a subsequent welding operation.

FIG. 4 is a flow chart illustrating an exemplary method of using the welding system 10 of FIG. 1. As previously described, welding power is provided from a welding power supply 12 to a welding application, as provided by block 118. For example, the welding application may be the wire feeder 14 coupled to the welding gun 16. Additionally, the welding power supply 12 may include control circuitry configured to control the welding power, as provided by block 120. A signal may be generated indicating the beginning of a welding operation, as provided by block 122. In certain embodiments, the signal may be generated by the depression of the gun trigger of the welding gun 16. In other embodiments, the signal may be generated by an arc monitoring system, a power monitoring system, or a welding automation system, such as a system including a welding robot. Thereafter, a signal may be generated to begin or modify the operation of the fume extractor 26, as provided by block 124. Control circuitry 38 may then apply control signals to the fume extractor 26 to begin or modify the operation of the fume extractor 26, as provided by block 126. After the operation of the fume extractor 26 has been initiated or modified, a feed of welding wire back be initiated and a welding arc may be created, as provided by block 128, and the welding operation may commence.

When the welding operation has concluded, a signal may be generated indicative of terminating the welding operation, as provided by block 130. For example, the release of the gun trigger of the welding gun 16 may indicate the conclusion of the welding operation. Alternatively, an arc monitoring system, a power monitoring system, or a welding automation system such as a welding robot may generate the signal indicating the conclusion of the welding operation. A signal may then be generated to terminate or modify the operation of the fume extractor 26, as represented by block 132. The feed of welding wire may terminate, and the welding arc may be extinguished, as represented by block 134. Thereafter, control circuitry 38 may apply control signals 38 to the fume extractor 26 to modify or terminate the operation of the fume extractor 26, as represented by block 136. The control circuitry 38 may modify the operation of the fume extractor 26 by signaling the fume extractor 26 to initiate a cleaning cycle of the fume extractor 26. The control circuitry 38 may signal the cleaning cycle based on certain operational information, including total welding time or the type of welding process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
    a fume extractor configured to be disposed adjacent to a welding application for extracting fumes produced during welding; and
    control circuitry configured to:
        command the fume extractor to operate at a first speed to draw in air at a first rate for a predetermined time in response to commencement of a welding operation and prior to establishment of the welding arc;
        command the fume extractor to transition from operation at the first speed to operation at a second speed to draw in air at a second rate in response to depression of a trigger of a welding torch for establishing a welding arc and while the welding arc is ongoing; and
        command the fume extractor to transition from operation at the second speed to operation at the first speed in response to a release of the trigger for terminating the welding arc and after termination of the welding arc until the beginning of a subsequent welding operation.

2. The system of claim 1, wherein the control circuitry is configured to command the fume extractor to operate at the second speed while the welding arc is ongoing.

3. The system of claim 1, wherein the control circuitry is configured to command the fume extractor to operate at the first speed for a predetermined time after termination of the welding arc.

4. The system of claim 1, wherein the control circuitry is configured to command the fume extractor to operate at a speed dependent upon a type of welding process selected for control by the control circuitry.

5. The system of claim 4, wherein the type of welding process is selected from a plurality of processes for which the control circuitry is configured, wherein the plurality of processes comprise at least a pulsed welding process and a self-shielded welding process.

6. The system of claim 1, wherein the second speed is greater than zero.

7. The system of claim 1, wherein the first speed is greater than zero.

8. A method comprising:
    controlling a fume extractor configured to be disposed adjacent to a welding application for extracting fumes produced during an arc welding operation via control circuitry, wherein controlling the fume extractor comprises:
        commanding, in response to depression of a trigger of a welding torch, the fume extractor to begin operation to draw in air at a first speed for at least a first predetermined time prior to establishment of a welding arc;
        commanding, after expiration of the first predetermined time, the fume extractor to transition from operation at the first speed to operation at a second speed to draw in air at a second rate while the welding arc is ongoing;
        commanding, in response to a release of the trigger, the fume extractor to continue operation to draw in air for at least a second predetermined time following extinguishing of the welding arc; and
        commanding, in response to expiration of the second predetermined time, the fume extractor to transition from operation at the second speed to operation at operation at the first speed.

9. The method of claim 8, comprising operating the fume extractor at a speed dependent upon a type of welding process selected for control by the control circuitry.

10. The method of claim 9, comprising enabling selection of the type of welding process through a user interface coupled to the control circuitry and configured to display a menu of a plurality of welding processes.

11. The method of claim 8, comprising operating the fume extractor at the first speed prior to establishment of the welding arc or after termination of the welding arc, or both.

\* \* \* \* \*